US012629727B2

(12) United States Patent
Jeon et al.

(10) Patent No.: US 12,629,727 B2
(45) Date of Patent: May 19, 2026

(54) SPRAY UNIT AND SUBSTRATE TREATMENT APPARATUS INCLUDING THE SAME

(71) Applicant: SEMES CO., LTD., Chungcheongnam-do (KR)

(72) Inventors: Myung A Jeon, Chungcheongnam-do (KR); Young Seop Choi, Chungcheongnam-do (KR); Young Jin Kim, Chungcheongnam-do (KR); Eun Hyeok Choi, Chungcheongnam-do (KR); Bok Kyu Lee, Chungcheongnam-do (KR); Je Myung Cha, Chungcheongnam-do (KR); Kyu Hwan Chang, Chungcheongnam-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 349 days.

(21) Appl. No.: 18/219,588

(22) Filed: Jul. 7, 2023

(65) Prior Publication Data

US 2024/0042493 A1 Feb. 8, 2024

(30) Foreign Application Priority Data

Aug. 2, 2022 (KR) ........................ 10-2022-0096300

(51) Int. Cl.
*B08B 3/02* (2006.01)
*B08B 3/08* (2006.01)

(52) U.S. Cl.
CPC .............. *B08B 3/022* (2013.01); *B08B 3/024* (2013.01); *B08B 3/08* (2013.01)

(58) Field of Classification Search
CPC ... H01L 21/67051; B08B 3/022; B08B 3/024; B08B 3/08
See application file for complete search history.

(56) References Cited

U.S. PATENT DOCUMENTS 9,498,866 B2 * 11/2016 Lee ........................ B24B 53/017
2004/0040177 A1 * 3/2004 Izumi ................ H01L 21/67034 34/492

(Continued)

FOREIGN PATENT DOCUMENTS

JP 11-319640 11/1999
KR 10-0855129 8/2008

(Continued)

OTHER PUBLICATIONS

Machine Translation of KR 1020130015611 to Song et al., Feb. 2013. (Year: 2013).*

(Continued)

*Primary Examiner* — Benjamin L Osterhout
(74) *Attorney, Agent, or Firm* — WOMBLE BOND DICKINSON (US) LLP

(57) ABSTRACT

A spray unit in which a plurality of nozzle heads are integrally coupled and a substrate treatment apparatus including the spray unit are provided. The substrate treatment apparatus includes: a substrate support unit supporting a substrate and including a spin head, which rotates the substrate; a treatment liquid retrieval unit retrieving substrate treatment liquids used in treating the substrate; and a spray unit including a plurality of nozzle heads and pipes, which are connected to the nozzle heads, and providing the substrate treatment liquids onto the substrate through the nozzle heads and the pipes, wherein the nozzle heads are moved at the same time.

20 Claims, 11 Drawing Sheets

(56) References Cited

U.S. PATENT DOCUMENTS

| | | | | |
|---|---|---|---|---|
| 2010/0029088 | A1* | 2/2010 | Mayer | C25F 3/12 438/748 |
| 2013/0008470 | A1* | 1/2013 | Dobashi | H01L 21/02052 134/21 |
| 2013/0255728 | A1* | 10/2013 | Noh | B05B 13/02 134/26 |
| 2013/0263897 | A1* | 10/2013 | Avoyan | B08B 3/022 134/153 |
| 2014/0230860 | A1* | 8/2014 | Chua | H01L 21/02052 134/144 |
| 2014/0311531 | A1* | 10/2014 | Su | H01L 21/67051 134/30 |
| 2014/0352737 | A1* | 12/2014 | Ookouchi | H01L 21/67051 134/30 |
| 2017/0297164 | A1* | 10/2017 | Kim | H01L 21/67 |

FOREIGN PATENT DOCUMENTS

| | | |
|---|---|---|
| KR | 10-2012-0015926 | 2/2012 |
| KR | 10-2013-0015611 | 2/2013 |
| KR | 10-1398442 | 5/2014 |
| KR | 10-2016-0027802 | 3/2016 |

OTHER PUBLICATIONS

Office Action dated Jun. 24, 2024 for Korean Patent Application No. 10-2022-0096300 and its English translation from Global Dossier.

Office Action dated Oct. 16, 2023 for Korean Patent Application No. 10-2022-0096300 and its English machine translation from Google Translate.

* cited by examiner

SPRAY UNIT AND SUBSTRATE TREATMENT APPARATUS INCLUDING THE SAME

CROSS-REFERENCE TO RELATED APPLICATION

This application claims priority from Korean Patent Application No. 10-2022-0096300 filed on Aug. 2, 2022, in the Korean Intellectual Property Office, and all the benefits accruing therefrom under 35 U.S.C. 119, the contents of which in its entirety are herein incorporated by reference.

BACKGROUND

1. Field

The present disclosure relates to a spray unit and a substrate treatment unit including the same, and more particularly, to a spray unit that can be used in a cleaning process and a substrate treatment apparatus including the spray unit.

2. Description of the Related Art

Semiconductor fabrication processes may be continuously performed in a semiconductor manufacturing facility and may be classified into preprocesses and postprocesses. The semiconductor manufacturing facility may be installed in a semiconductor fabrication plant (or a "fab") for manufacturing a semiconductor device.

The preprocesses refer to processes for completing a chip by forming a circuit pattern on a wafer. The preprocesses may include a deposition process that forms a thin film on the wafer, a photolithography process that transfers a photoresist pattern onto the thin film using a photo mask, an etching process that selectively removes any unnecessary parts using a chemical or a reactive gas to form a desired circuit pattern on the wafer, an ashing process that removes parts of the photoresist pattern that remain after the etching process, an ion implantation process that implants ions into parts connected to the circuit pattern to impart the characteristics of an electronic device, and a cleaning process that removes any contamination sources from the wafer.

The postprocesses refer to processes of evaluating the performance of a product obtained by the preprocesses. The postprocesses may include a primary inspection process that tests each chip on a wafer to determine whether they are bad or good, a packaging process that cuts and separates each chip into a proper product shape through dicing, die bonding, wire bonding, molding or marking, and a final inspection process that finally inspects each chip for their characteristics and reliability through electrical testing or burn-in testing.

Substrates (e.g., wafers) may be treated by a wet cleaning process using chemicals and deionized water (DIW) or by a dry cleaning process using plasma. In the wet cleaning process, substrates may be placed on a spin head, and chemicals and DI water may be ejected onto the substrates using nozzles.

Each nozzle is supposed to eject a single chemical and is driven independently, and to eject two or more chemicals, nozzles need to be replaced, in which case, however, an "ejection vacuum" may occur.

To prevent the occurrence of an ejection vacuum and the interference of nozzles during the replacement of nozzles for using chemicals, oblique DIW nozzles may be used. In this case, however, the process chamber may be contaminated due to scattering, and as a result, the productivity may be lowered.

SUMMARY

Aspects of the present disclosure provide a spray unit in which a plurality of nozzles heads are integrally coupled together and a substrate treatment apparatus including the spray unit.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a substrate treatment apparatus includes: a substrate support unit supporting a substrate and including a spin head, which rotates the substrate; a treatment liquid retrieval unit retrieving substrate treatment liquids used in treating the substrate; and a spray unit including a plurality of nozzle heads and pipes, which are connected to the nozzle heads, and providing the substrate treatment liquids onto the substrate through the nozzle heads and the pipes, wherein the nozzle heads are moved at the same time.

According to another aspect of the present disclosure, a substrate treatment apparatus includes: a substrate support unit supporting a substrate and including a spin head, which rotates the substrate; a treatment liquid retrieval unit retrieving substrate treatment liquids used in treating the substrate; and a spray unit including a plurality of nozzle heads and pipes, which are connected to the nozzle heads, and providing the substrate treatment liquids onto the substrate through the nozzle heads and the pipes, wherein the nozzle heads or the pipes are integrally coupled together via a connection member, the nozzle heads include first and second nozzle heads, which eject chemicals, and a third nozzle head, which ejects deionized water (DIW), the third nozzle head is disposed between the first and second nozzle heads, and the nozzle heads alternately eject the chemicals and the DIW, but for a predetermined amount of time, eject the chemicals and the DIW at the same time.

According to another aspect of the present disclosure, a spray unit includes: a plurality of nozzle heads; and pipes connected to the nozzle heads, wherein the spray unit provides substrate treatment liquids for treating a substrate, onto the substrate through the nozzle heads and the pipes, the nozzle heads include first and second nozzle heads, which eject chemicals, and a third nozzle head, which ejects DIW, and the first, second, and third nozzle heads are moved at the same time.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
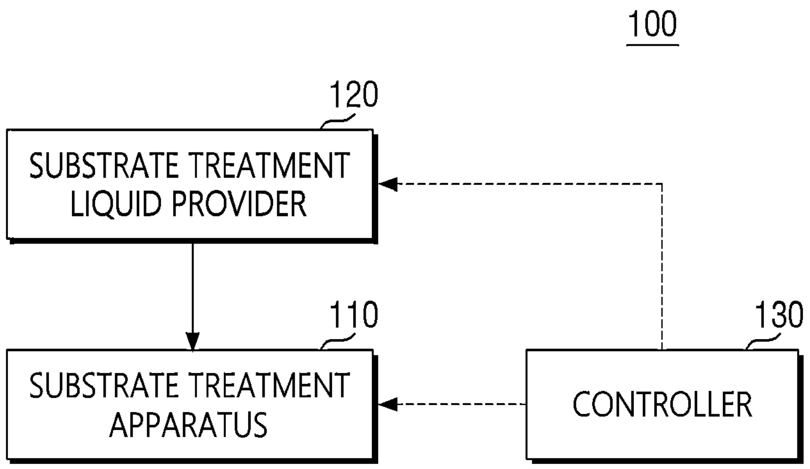
FIG. 1 is a block diagram of a substrate treatment system that can be used in a cleaning process.

Embodiments of the present disclosure will be described with reference to the attached drawings. Like reference numerals indicate like elements, and thus, detailed descriptions thereof will not be repeated.

The present disclosure relates to a spray unit having a plurality of nozzle heads that are integrally coupled together and a substrate treatment apparatus including the spray unit.

FIG. 1 is a block diagram of a substrate treatment system that can be used in a cleaning process. Referring to FIG. 1, a substrate treatment system 100 may include a substrate treatment apparatus 110, a substrate treatment liquid provider 120, and a controller 130.

The substrate treatment apparatus 110 treats a substrate using chemicals. The substrate treatment apparatus 110 may be provided as a cleaning process chamber cleaning a substrate using chemicals.

The chemicals may be liquid materials (e.g., organic solvents) or gaseous materials. The chemicals may be highly volatile and may include materials that generate large amounts of fumes or are highly viscous and persistent. The chemicals may be selected from among, for example, substances containing isopropyl alcohol (IPA), substances containing sulfuric acid component (e.g., a sulfuric acid peroxide mixture (SPM) containing sulfuric acid and hydrogen peroxide), substances containing ammonia water (e.g., Standard Clean 1 (SC-1) ($H_2O_2$+$NH_4OH$), substances containing hydrofluoric acid (e.g., diluted hydrogen fluoride (DHF)), and substances containing phosphoric acid. The chemicals will hereinafter be defined and referred to as substrate treatment liquids.

When used in a cleaning process, the substrate treatment apparatus 110 may rotate the substrate with a spin head and provide the chemicals onto the substrate using nozzles. In a case where the substrate treatment apparatus 110 is provided as a liquid treatment chamber, the substrate treatment apparatus 110 may include a substrate support unit 210, a treatment liquid retrieval unit 220, an elevation unit 230, and a spray unit 240, as illustrated in FIG. 2.

Figure 2:
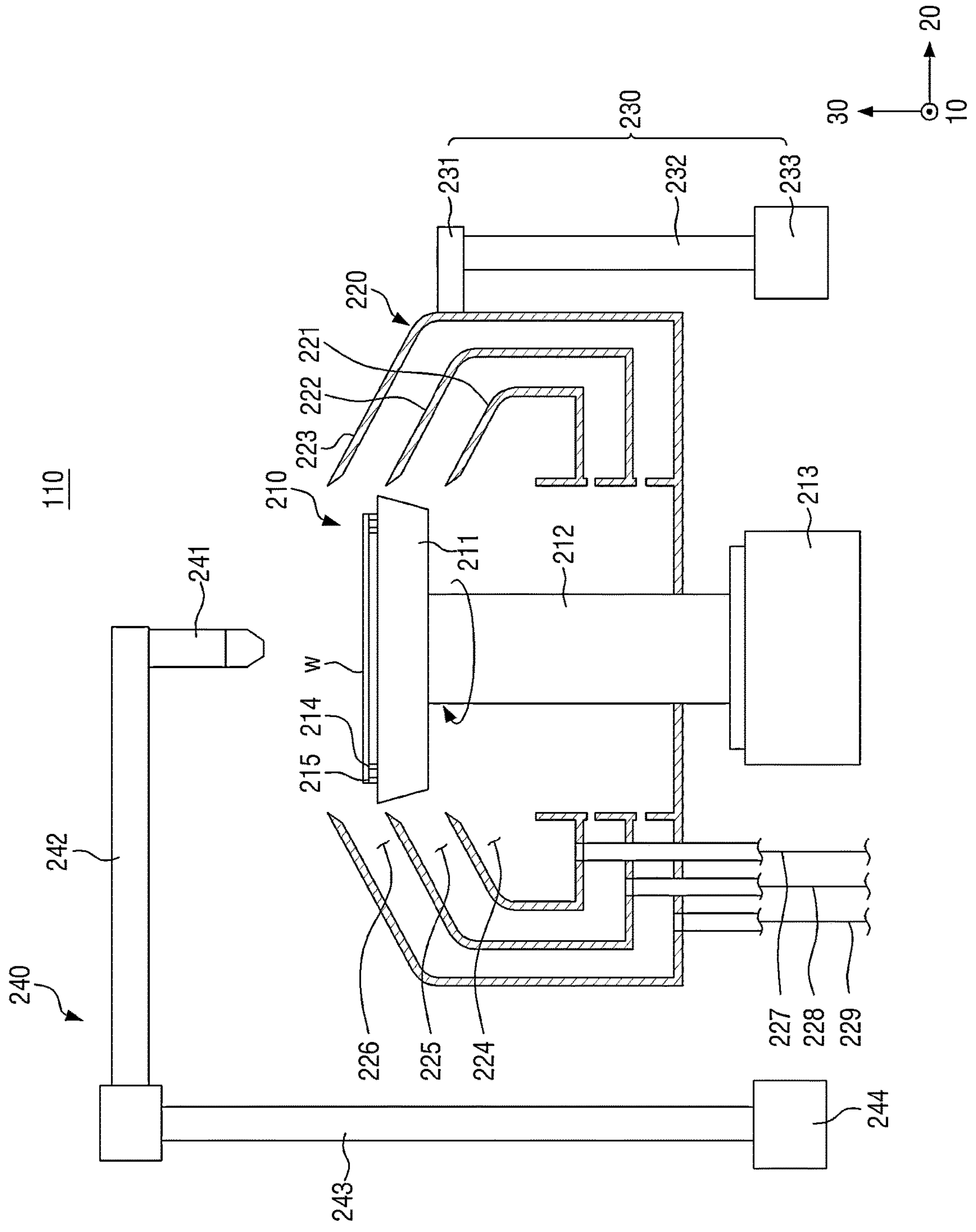
FIG. 2 is a schematic view illustrating the internal structure of the substrate treatment system of FIG. 1.

FIG. 2 is a schematic view illustrating the internal structure of the substrate treatment system 100.

Referring to FIG. 2, the substrate support unit 210 is a module supporting a substrate W. The substrate support unit 210 may rotate the substrate W in a direction perpendicular to a third direction 30, i.e., in a first or second direction 10 or 20, when treating the substrate W. The substrate support unit 210 may be disposed in the treatment liquid retrieval unit 220 to retrieve substrate treatment liquids used in treating the substrate W.

The substrate support unit 210 may include a spin head 211, a rotating shaft 212, a rotation drive module 213, support pins 214, and guide pins 215.

The spin head 211 rotates in the rotation direction of the rotating shaft 212 (i.e., in a direction perpendicular to the third direction 30). The spin head 211 may have the same shape as the substrate W, but the present disclosure is not limited thereto. Alternatively, the spin head 211 may have a different shape from the substrate W.

The rotating shaft 212 generates a rotational force using energy provided by the rotation drive module 213. The rotating shaft 212 may be coupled to the rotation drive module 213 and the spin head 211 and may deliver the rotational force from the rotation drive module 213 to the spin head 211. The spin head 211 may rotate together with the rotating shaft 212, in which case, the substrate W, mounted on the spin head 211, may also rotate together with the spin head 211.

The support pins 214 and the guide pins 215 fix the substrate W on the spin head 211. The support pins 214 may support the bottom surface of the substrate W on the spin head 211, and the guide pins 215 may support the side surface of the substrate W. A plurality of support pins 214 and a plurality of guide pins 215 may be installed on the spin head 211.

The support pins 214 may be disposed to form a ring shape as a whole. The support pins 214 may be able to support the bottom surface of the substrate W, spacing the bottom surface of the substrate W a predetermined distance apart from the top of the spin head 211.

The guide pins 215, which are chucking pins, may support the substrate W not to deviate from its original position when the spin head 211 rotates.

The treatment liquid retrieval unit 220 retrieves substrate treatment liquids used in treating the substrate W. The treatment liquid retrieval unit 220 may be installed to surround the substrate support unit 210 and may thus provide space in which to treat the substrate W.

When the substrate W is mounted and fixed on the substrate support unit 210 and begins to be rotated by the substrate support unit 210, the spray unit 240 may spray substrate treatment liquids onto the substrate W under the control of the controller 130. Then, the substrate treatment liquids sprayed onto the substrate W may scatter toward the treatment liquid retrieval unit 220 due to a centrifugal force generated by the rotation of the substrate support unit 210. In this case, the treatment liquid retrieval unit 220 may retrieve the substrate treatment liquids entering inlets (i.e., first, second, and third openings 224, 225, and 226 of first, second, and third retrieval containers 221, 222, and 223).

The treatment liquid retrieval unit 220 may include a plurality of retrieval containers. For example, the treatment liquid retrieval unit 220 may include three retrieval containers. In this case, the treatment liquid retrieval unit 220 can separate and retrieve different substrate treatment liquids using the retrieval containers and can thus recycle the substrate treatment liquids.

The treatment liquid retrieval unit 220 may include three retrieval containers, i.e., the first, second, and third retrieval containers 221, 222, and 223. The first, second, and third retrieval containers 221, 222, and 223 may be implemented as, for example, bowls.

The first, second, and third retrieval containers 221, 222, and 223 may retrieve different substrate treatment liquids. For example, the first retrieval container 221 may retrieve a rinse liquid (e.g., deionized water (DIW)), the second retrieval container 222 may retrieve a first chemical, and the third retrieval container 223 may retrieve a second chemical.

The first, second, and third retrieval containers 221, 222, and 223 may be connected to retrieval lines 227, 228, and 229, respectively, which extend in a downward direction (e.g., the third direction 30), at the bottoms thereof. The first, second, and third retrieval containers 221, 222, and 223 may retrieve first, second, and third treatment liquids, respectively, and the first, second, and third treatment liquids may be treated by a treatment liquid recycling system (not illustrated) to be recyclable.

Each of the first, second, and third retrieval containers 221, 222, and 223 may be provided in a ring shape surrounding the substrate support unit 210. The size of the retrieval containers of the treatment liquid retrieval unit 220 may increase in the second direction 20 from the first retrieval container 221 to the second retrieval container 222 to the third retrieval container 223. When the distance between the first and second retrieval containers 221 and 222 is defined as a first distance and the distance between the second and third retrieval containers 222 and 223 is defined as a second distance, the first and second distances may be the same, but the present disclosure is not limited thereto. Alternatively, the first and second distances may differ from each other. That is, the first distance may be greater than, or less than, the second distance.

The elevation unit 230 may rectilinearly move the treatment liquid retrieval unit 220 in a vertical direction (or in the third direction 30). In this manner, the elevation unit 230 may adjust the height of the treatment liquid retrieval unit 220 relative to the substrate support unit 210 (or the substrate W).

The elevation unit 230 may include a bracket 231, a first support shaft 232, and a first drive module 233.

The bracket 231 is fixed to an outer wall of the treatment liquid retrieval unit 220. The bracket 231 may be coupled to the first support shaft 232, which is vertically movable by the first drive module 233.

When the substrate W is mounted on the substrate support unit 210, the substrate support unit 210 may be positioned above the treatment liquid retrieval unit 220. When the substrate W is detached from the substrate support unit 210, the substrate support unit 210 may also be positioned above the treatment liquid retrieval unit 220. In this case, the elevation unit 230 may lift down the treatment liquid retrieval unit 220.

When the substrate W is being treated with a substrate treatment liquid, the substrate treatment liquid may be retrieved in one of the first, second, and third retrieval containers 221, 222, and 223 depending on the type of the substrate treatment liquid. In this case, the elevation unit 230 may lift up or down the treatment liquid retrieval unit 220. For example, if the substrate W is being treated with the first treatment liquid, the elevation unit 230 may lift up the retrieval liquid retrieval unit 220 such that the substrate W may be positioned at a height corresponding to the first opening 224 of the first retrieval container 221.

The elevation unit 230 may control the height of the treatment liquid retrieval unit 220 relative to the substrate support unit 210 (or the substrate W) by rectilinearly moving the substrate support unit 210 in the vertical direction, but the present disclosure is not limited thereto.

Alternatively, the elevation unit 230 may control the height of the treatment liquid retrieval unit 220 relative to the substrate support unit 210 (or the substrate W) by rectilinearly moving both the substrate support unit 210 and the treatment liquid retrieval unit 220 at the same time in the vertical direction.

The spray unit 240 is a module providing substrate treatment liquids onto the substrate W to treat the substrate W. At least one spray unit 240 may be installed in the substrate treatment unit 120. If multiple spray units 240 are installed in the substrate treatment unit 120, the multiple spray units 240 may spray different substrate treatment liquids onto the substrate W.

The spray unit 240 may include nozzles 241, a nozzle support module 242, a second support shaft 243, and a second drive module 244.

The nozzles 241 are installed at the end of the nozzle support module 242. The nozzles 241 may be moved to a process position or a standby position by the second drive module 244.

The process position refers to a position above the substrate W, and the standby position refers to a position other than the process position. The nozzles 241 may be moved to the process position when ejecting substrate treatment liquids onto the substrate W, and may be moved to the standby position after ejecting the substrate treatment liquids onto the substrate W.

The nozzle support module 242 supports the nozzles 241. The nozzle support module 242 may be formed to extend in the length direction of the spin head 211. That is, the nozzle support module 242 may be provided along the second direction 20.

The nozzle support module 242 may be coupled to the second support shaft 243, which is formed to extend perpendicularly to the length direction of the nozzle support module 242. The second support shaft 243 may be formed to extend in the height direction of the spin head 211. That is, the second support shaft 243 may be provided along the third direction 30.

The second drive module 244 is a module rotating and lifting up or down the second support shaft 243 and the nozzle support module 242, which is interlocked with the second support shaft 243. The nozzles 241 may be moved to the process position or the standby position by the second drive module 244.

Referring again to FIG. 1, the substrate treatment liquid provider 120 provides substrate treatment liquids to the substrate treatment apparatus 110. The substrate treatment liquid provider 120 may be connected to the spray unit 240 of the substrate treatment apparatus 110 and may operate under the control of the controller 130.

The controller 130 controls the operation of the substrate treatment apparatus 110. Specifically, the controller 130 may control the operation of the rotation drive module 213 of the substrate support unit 210, the operation of the first drive module 233 of the elevation unit 230, and the operation of the second drive module 244 of the spray unit 240.

The controller 130 may be implemented as a computer or a server including a process controller, a control program, an input module, an output module (or a display module), and a memory module. The process controller may include a microprocessor performing a control function for each of the elements of the substrate treatment apparatus 110, the control program may execute various treatment processes of the substrate treatment apparatus 110 under the control of the process controller, and the memory module stores programs (i.e., treatment recipes) for executing the various treatment processes of the substrate treatment apparatus 110 in accordance with various data and process conditions.

The controller 130 may control the operation of the substrate treatment liquid provider 120 such that substrate treatment liquids may be supplied from the substrate treatment liquid provider 120 to the substrate treatment apparatus 110.

As already mentioned above, the substrate treatment apparatus 110 may include the spray unit 240, which ejects chemicals or DIW onto the substrate W, and the spray unit 240 may be obtained by integrally coupling a plurality of nozzle heads, which are for ejecting different liquids. The substrate treatment apparatus 110 can minimize any ejection vacuum that may result from the replacement of the nozzles 241 and can thus improve process efficiency.

In the substrate treatment apparatus 110, not only nozzles 241 for ejecting chemicals, but also nozzles 241 for ejecting DIW may also be formed as vertical nozzles. The substrate treatment apparatus 110 can address the contamination of a process chamber due to scattering and can improve productivity.

Figure 3:
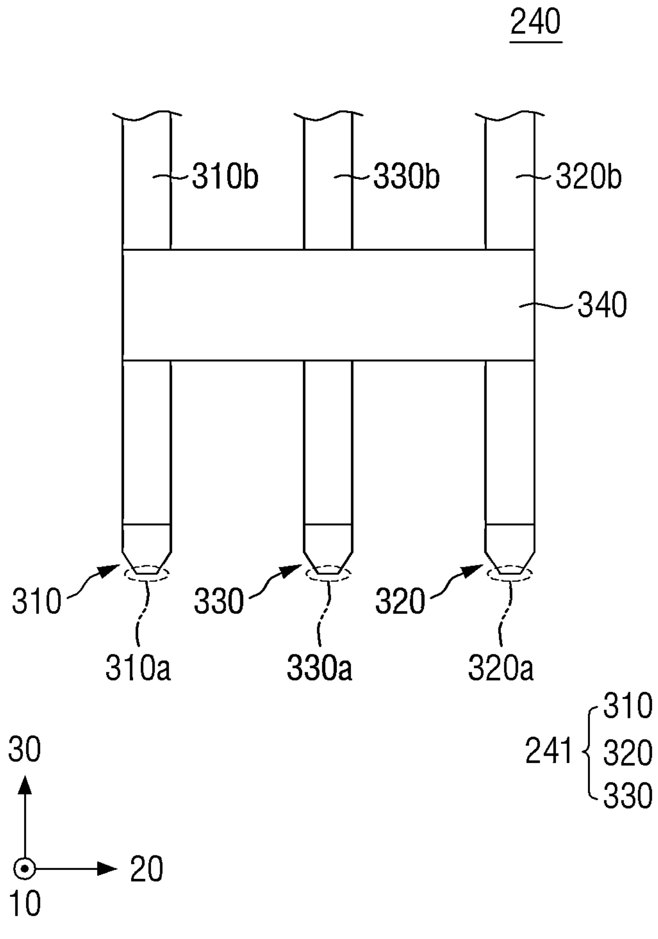
FIG. 3 is a first exemplary schematic view of a spray unit according to an embodiment of the present disclosure, in which a plurality of nozzle heads are integrally coupled together.

FIG. 3 is a first exemplary schematic view of a spray unit according to an embodiment of the present disclosure, in which a plurality of nozzle heads are integrally coupled together.

Referring to FIG. 3, the spray unit 240 may include a plurality of nozzle heads to eject chemicals or DIW onto the substrate W. The spray unit 240 will hereinafter be described as including three nozzle heads, i.e., first, second, and third nozzle heads 310, 320, and 330, but the number of nozzle heads installed in the spray unit 240 is not particularly limited.

The first nozzle head 310 may be disposed on one side of the third nozzle head 330. The first nozzle head 310 may eject the first chemical onto the substrate W. An outlet 310*a* of the first nozzle head 310 may be installed to face downward (i.e., the third direction 30). The outlet 310*a* of the first nozzle head 310 will hereinafter be referred to as a first outlet 310*a*.

The second nozzle head 320 may be disposed on the other side of the third nozzle head 330. The second nozzle head 320 may eject the second chemical onto the substrate W. Here, the second chemical may be a different chemical from the first chemical. An outlet 320*a* of the second nozzle head 320, like the first outlet 310*a*, may be installed to face downward (i.e., the third direction 30). The outlet 320*a* of the second nozzle head 320 will hereinafter be referred to as a second outlet 320*a*.

The third nozzle head 330 may be disposed between the first and second nozzle heads 310 and 320. That is, the first, second, and third nozzle heads 310, 320, and 330 may be disposed side by side, and the third nozzle head 330 may be disposed in the middle. The third nozzle head 330 may eject DIW onto the substrate W. An outlet 330*a* of the third nozzle head 330, like the first and second outlets 310*a* and 320*a*, may be installed to face downward (i.e., the third direction 30). The outlet 330*a* of the third nozzle head 330 will hereinafter be referred to as a third outlet 330*a*.

Conventionally, DIW nozzle heads are formed as oblique nozzles, and a process chamber is highly likely to be contaminated due to scattering. The third nozzle head 330, like the first and second nozzle heads 310 and 320, which eject chemicals, may be formed as a vertical nozzle. Thus, the third nozzle head 330 may be able to eject DIW onto the substrate W in the vertical direction.

Specifically, conventional nozzle heads for ejecting DIW are formed as oblique nozzles to address any interference that may occur when the nozzles 241 are being moved. Not only the first and second nozzle heads 310 and 320, which eject chemicals, but also the third nozzle head 330, which ejects DIW, may be integrally formed. Thus, chemicals and DIW can both be ejected onto the substrate W in the vertical direction.

The first, second, and third outlets 310*a*, 320*a*, and 330*a* may be formed on the same level. That is, the first, second, and third outlets 310*a*, 320*a*, and 330*a* may eject chemicals or DIW onto the substrate W from the same height.

However, the present disclosure is not limited to this. Alternatively, the first, second, and third outlets 310*a*, 320*a*, and 330*a* may be formed on different levels. Alternatively, some of the first, second, and third outlets 310*a*, 320*a*, and 330*a* may be formed on the same level, and the other outlet(s) may be formed on a different level.

Figure 4:
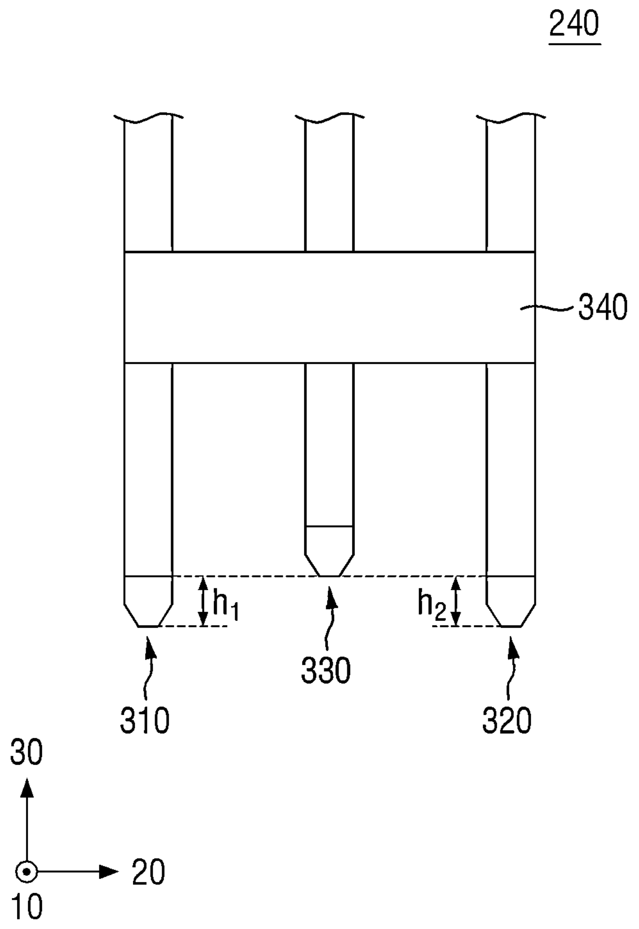
FIG. 4 is a second exemplary schematic view of the spray unit according to an embodiment of the present disclosure.

For example, referring to FIG. 4, the third outlet 330*a* may be formed on a higher level than the first and second outlets 310*a* and 320*a*, and the height of the third outlet 330*a* may differ from the heights of the first and second outlets 310*a* and 320*a* by $h_1$ and $h_2$, respectively. The height differences $h_1$ and $h_2$ may be equal (i.e., $h_1=h_2$) or may differ from each other ($h_1 \neq h_2$, i.e., $h_1>h_2$ or $h_1<h_2$). FIG. 4 is a second exemplary schematic view of the spray unit according to an embodiment of the present disclosure.

The first, second, and third nozzle heads 310, 320, and 330 may provide different liquids onto the substrate W. The first, second, and third nozzle heads 310, 320, and 330 may be connected to the substrate treatment liquid provider 120 via different pipes, i.e., pipes 310*b*, 320*b*, and 330*b*. The pipes 310*b*, 320*b*, and 330*b*, at which the first, second, and third nozzle heads 310, 320, and 330 are installed, may be provided in the substrate treatment apparatus 110 to be exposed to the outside. The pipes 310*b*, 320*b*, and 330*b*, which are connected to the first, second, and third nozzle heads 310, 320, and 330, respectively, will hereinafter be referred to as first, second, and third pipes 310*b*, 320*b*, and 330*b*, respectively.

Figure 5:
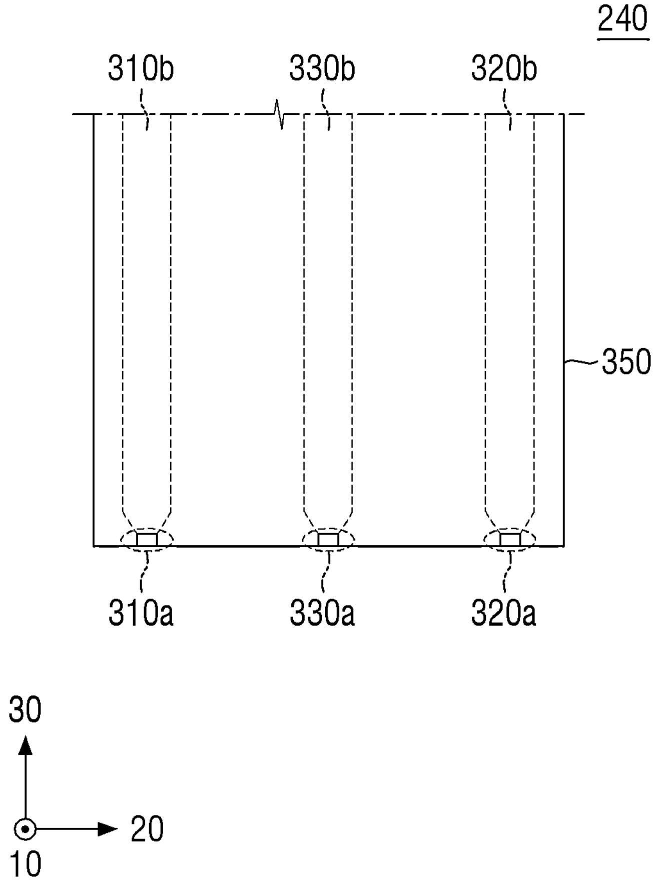
FIG. 5 is a third exemplary schematic view of the spray unit according to an embodiment of the present disclosure.

However, the present disclosure is not limited to this. Alternatively, the first, second, and third pipes 310*b*, 320*b*, and 330*b* may be provided in the substrate treatment apparatus 110 not to be exposed to the outside. For example, referring to FIG. 5, the first, second, and third pipes 310*b*, 320*b*, and 330*b* may be positioned inside one body part 350, and only the first, second, and third outlets 310*a*, 320*b*, and 330*b* may be exposed to the outside. FIG. 5 is a third exemplary schematic view of the spray unit according to an embodiment of the present disclosure.

The first, second, and third nozzle heads 310, 320, and 330 may be integrally coupled together. That is, even when the first, second, and third nozzle heads 310, 320, and 330 are connected to the substrate treatment liquid provider 120 through the first, second, and third pipes 310*b*, 320*b*, and 330*b*, respectively, the first, second, and third nozzle heads 310, 320, and 330 may be moved together in a group at the same time.

Figure 6:
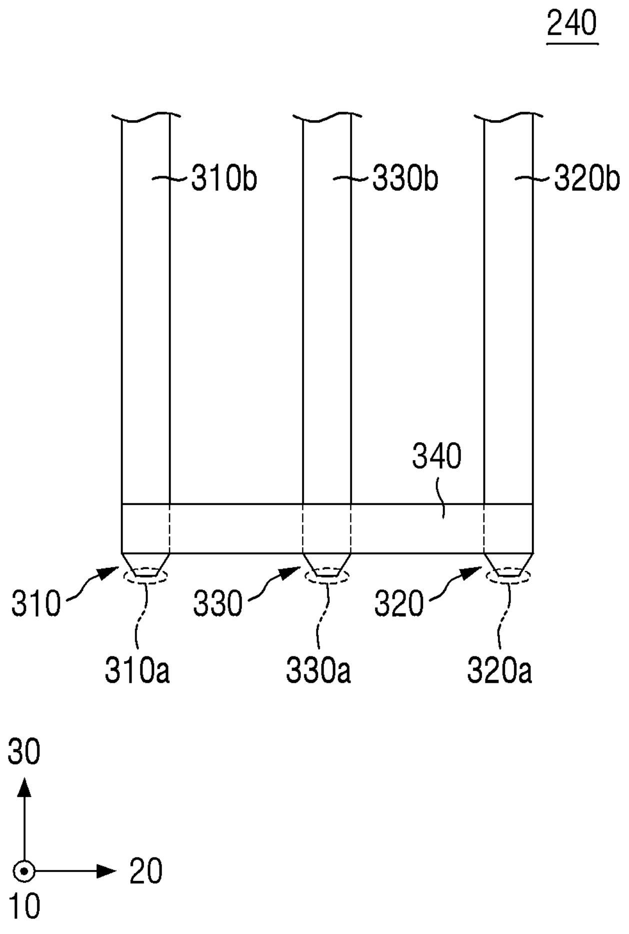
FIG. 6 is a fourth exemplary schematic view of the spray unit according to an embodiment of the present disclosure.

In this case, the first, second, and third pipes 310*b*, 320*b*, and 330*b* may be integrally coupled together via a connection member 340. Referring to FIG. 6, the first, second, and third nozzle heads 310, 320, and 330 may be integrally coupled together by the connection member 340. FIG. 6 is a fourth exemplary schematic view of the spray unit according to an embodiment of the present disclosure.

As already mentioned above, in a case where the spray unit 240 includes the first, second, and third nozzle heads 310, 320, and 330, the third nozzle head 330, which ejects DIW onto the substrate W, may be disposed in the middle, and the first and second nozzle heads 310 and 320, which eject chemicals onto the substrate W, may be disposed on both sides of the third nozzle head 330. In this case, the contamination of the second nozzle head 320 with the first chemical ejected from the first nozzle head 310 can be prevented, and the contamination of the first nozzle head 310 with the second chemical ejected from the second nozzle head 320 can also be prevented.

Figure 7:
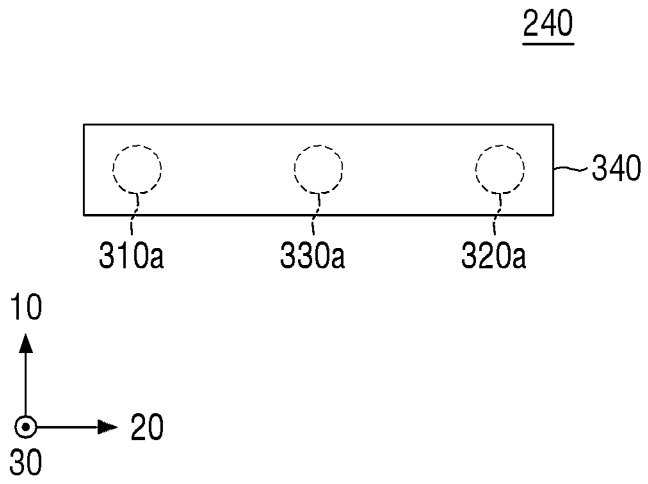
FIG. 7 is a first exemplary schematic view illustrating the layout of the nozzle heads.
Figure 8:
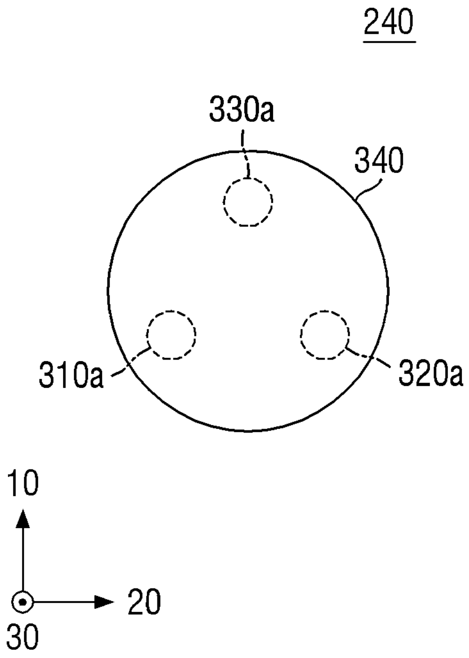
FIG. 8 is a second exemplary schematic view illustrating the layout of the nozzle heads.

However, the present disclosure is not limited to this. Alternatively, the first, second, and third nozzle heads 310, 320, and 330 may be arranged not in a row as illustrated in FIG. 7, but in a circle as illustrated in FIG. 8. In this case, the first and second nozzle heads 310 and 320 may preferably be spaced sufficiently apart not to be contaminated with each other's chemicals. FIG. 7 is a first exemplary schematic view illustrating the layout of the nozzle heads of the spray unit according to an embodiment of the present disclosure. FIG. 8 is a second exemplary schematic view illustrating the layout of the nozzle heads of the spray unit according to an embodiment of the present disclosure.

A plurality of nozzle heads for ejecting the first chemical, the second chemical, and DIW may be grouped together to be able to act as a single nozzle head and to eject each of the first chemical, the second chemical, and DIW independently. A first chemical nozzle head, a DIW nozzle head, and a second chemical nozzle head may be sequentially arranged, and the DIW nozzle head may be arranged in the middle.

By arranging the first, second, and third nozzle heads 310, 320, and 330 in this manner, the contamination of the nozzles 241 that may be caused by scattering can be prevented even if chemicals and DIW are ejected at the same time, and the nozzles 241 can be spaced apart from one another by more than a predetermined distance. Also, any ejection vacuum can be prevented during the replacement of the nozzles 241, and productivity can be improved.

The substrate treatment apparatus 110 may treat the substrate W by ejecting three types of liquids, i.e., the first chemical, DIW, and the second chemical, onto the substrate W in the order of the first chemical, DIW, the second chemical, and DIW and drying the substrate W. Thus, in a case where the first, second, and third nozzle heads 310, 320, and 330 are integrally coupled together, there is a need to arrange the first, second, and third nozzle heads 310, 320, and 330 to be suitable for the replacement of chemicals with DIW and vice versa. Specifically, a DIW nozzle head, i.e., the third nozzle head 330, may be arranged between two chemical nozzle heads, i.e., the first and second nozzle heads 310 and 320.

To control the distance between the nozzles 241, a structure capable of ejecting liquids at the same time may be provided. In the case of rotating the substrate W at low revolutions per minute (RPM) with the spin head 211, chemicals can be relatively stably scattered, and thus, there is almost no risk of the nozzles 241 being contaminated with each other's chemicals when ejecting the chemicals at the same time. On the other hand, in the case of rotating the substrate W at high RPM with the spin head 211 or simultaneously ejecting two different liquids (e.g., chemicals and DIW) at a high flow rate, the nozzles 241 are highly likely to be contaminated. Thus, the distance between the nozzles 241 may be controlled based on the ejection flow rate of the nozzles 241 or the rotation speed of the substrate W.

To this end, the spray unit 240 may further include a third drive module. The third drive module may control the distance between the nozzles 241 by moving the first, second, and third nozzle heads 310, 320, and 330 in a horizontal direction (or in the first or second direction 10 or 20) or by moving the first, second, and third pipes **310*b*, 320*b*, and 330*b*, which are connected to the first, second, and third nozzle heads 310, 320, and 330**, respectively, in the horizontal direction.

Figure 9:
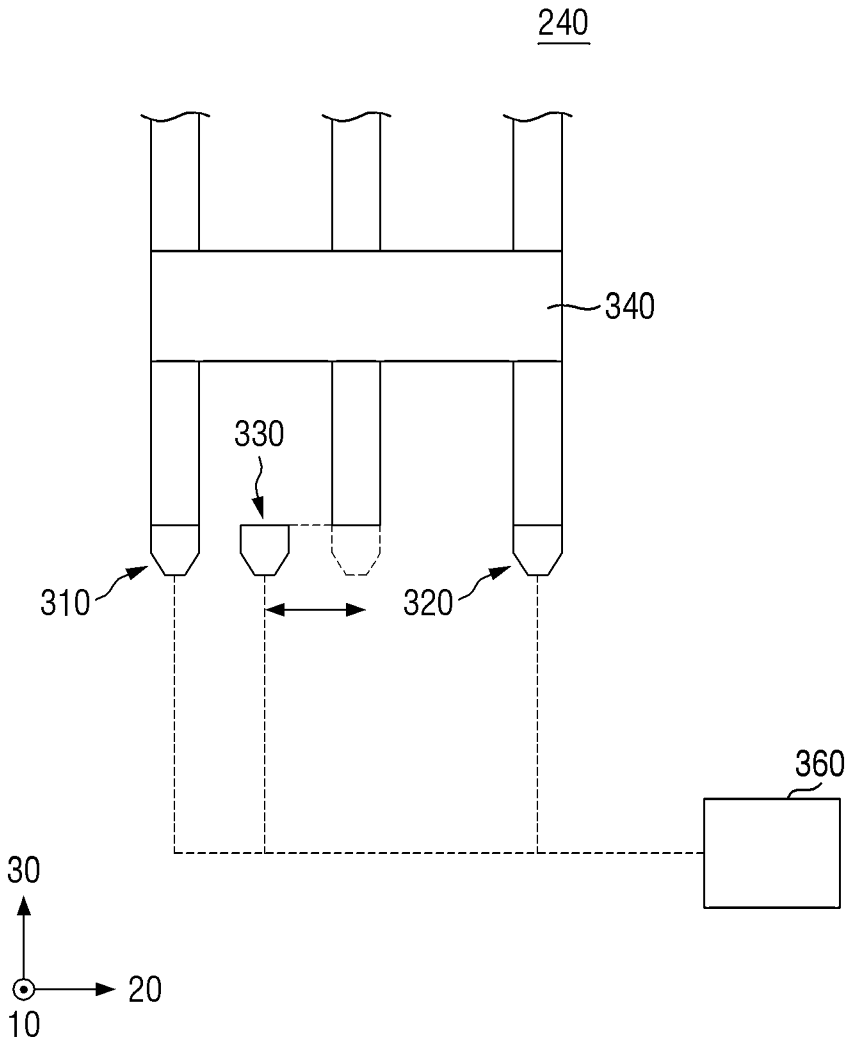
FIG. 9 is a first exemplary schematic view illustrating how to control the distance between nozzles with the nozzle heads of the spray unit according to an embodiment of the present disclosure.

Specifically, for example, referring to FIG. 9, a third drive module 369 may move the third nozzle 330 in the horizontal direction (or in the first or second direction 10 or 20) such that the third nozzle head 330 may become closer to the second nozzle head 320 than to the first nozzle head 310. FIG. 9 is a first exemplary schematic view illustrating how to control the distance between nozzles with the nozzle heads of the spray unit according to an embodiment of the present disclosure.

Figure 10:
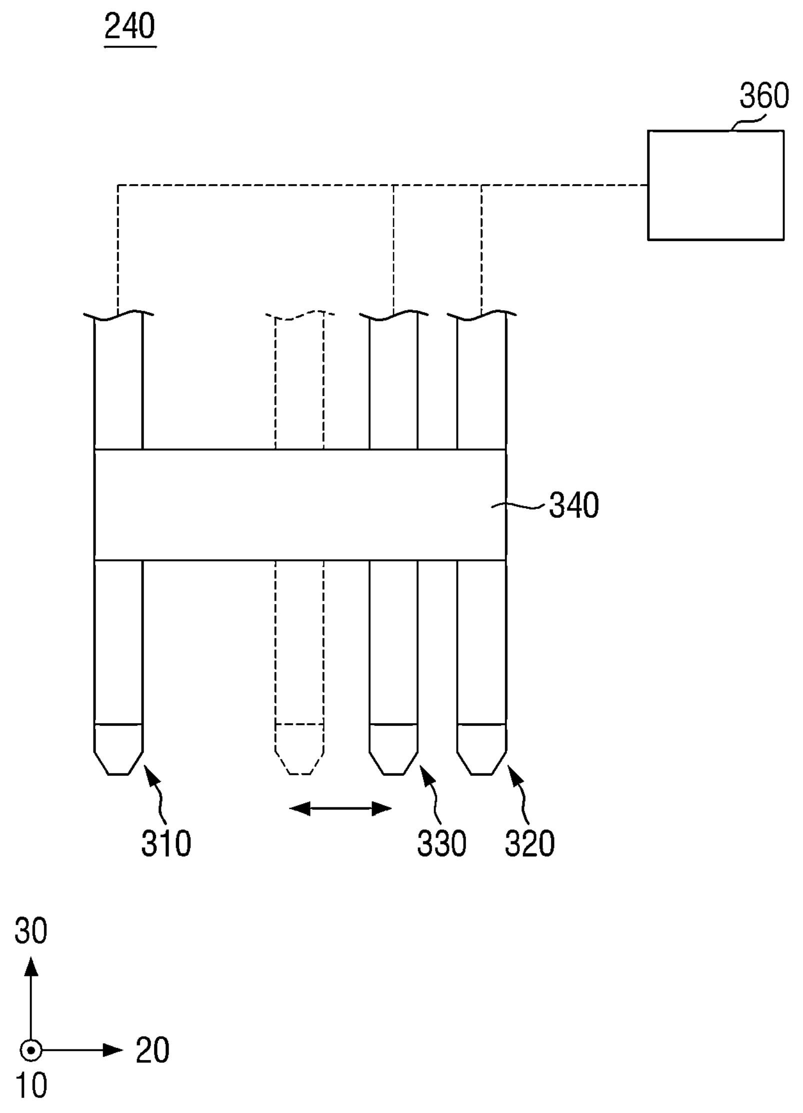
FIG. 10 is a second exemplary schematic view illustrating how to control the distance between the nozzles with the nozzle heads of the spray unit according to an embodiment of the present disclosure.

In another example, referring to FIG. 10, the third drive module 360 may move the third nozzle head 330 and the third pipe **330*b* in the horizontal direction (or in the first or second direction 10 or 20) such that the third nozzle head 330 may become closer to the first nozzle head 310 than to the second nozzle head 320. FIG. 10** is a second exemplary schematic view illustrating how to control the distance between the nozzles with the nozzle heads of the spray unit according to an embodiment of the present disclosure.

The third drive module 360 may move the first, second, and third nozzle heads 310, 320, and 330 in the vertical direction (or the third direction 30). In this manner, the first, second, and third nozzle heads 310, 320, and 330 may be formed on different levels.

The distance between the first, second, and third nozzle heads 310, 320, and 330 may be set in advance depending on the flow rate of substrate treatment liquids ejected from the first, second, and third nozzle heads 310, 320, and 330 or the rotation speed of the substrate W, and the first, second, and third nozzle heads 310, 320, and 330 may be installed in the substrate treatment apparatus 110 to be spaced apart from one another in accordance with the result of the setting. In this case, the spray unit 240 may not include the third drive module 360.

In a case where chemicals and DIW are ejected at the same time, the distance between the first, second, and third nozzle heads 310, 320, and 330 may be set to be equal to or greater than a radius r of water jumps of the ejected chemicals, depending on the boundary layer. In this case, the distance between the first, second, and third nozzle heads 310, 320, and 330 may preferably not exceed the diameter of the substrate W.

The more distant the nozzles 241 are from one another, the less likely hydraulic jumps are to occur upon the collision of two fluids. The distance between the nozzles 241 may be about 30 mm or greater in consideration of the flow rate of chemicals and may be about 70 mm or less in consideration of the size of the substrate W.

The distance between the first, second, and third nozzle heads 310, 320, and 330 may not necessarily be controlled simply based on the flow rate of substrate treatment liquids or the rotation speed of the substrate W. The controller 130 may also consider the type, density, and viscosity of substrate treatment liquids, whether two or more substrate treatment liquids are to be ejected at the same time, and the distances between the substrate W and the first, second, and third nozzle heads 310, 320, and 330 when controlling the distance between the first, second, and third nozzle heads 310, 320, and 330.

As already mentioned above, three nozzle heads may be coupled together such that three types of nozzles, including a DIW nozzle, may act as a single nozzle. The three types of nozzles may eject three types of chemicals, and the nozzle in the middle may eject DIW for a rinse. Accordingly, the other two nozzles may not be able to be affected by fumes or the scattering of chemicals. Also, each of the three types of chemicals can be ejected independently. The three types of nozzles may include a DIW nozzle head and may be arranged in the order of a first chemical nozzle, the DIW nozzle, and a second chemical nozzle so that the DIW nozzle may be positioned in the middle.

Figure 11:
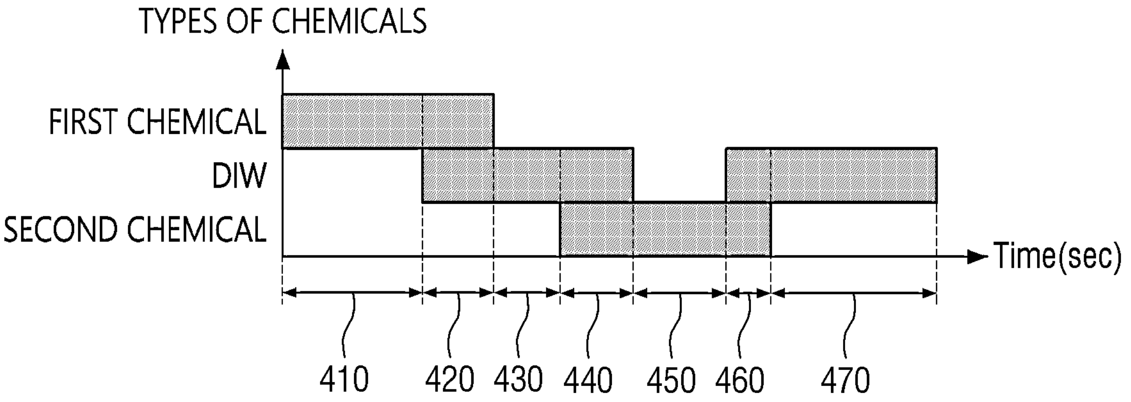
FIG. 11 is a graph showing the order in which the nozzle heads of the spray unit according to an embodiment of the present disclosure ejects substrate treatment liquids.

Valves may be switched on or off, as illustrated in FIG. 11, in order for the first, second, and third pipes 310*b*, 320*b*, and 330*b*, which are connected to the first, second, and third nozzle heads 310, 320, and 330, respectively, to eject chemicals. That is, referring to FIG. 11, the first chemical may be ejected onto the substrate W during a first period 410, the first chemical and DIW are ejected at the same time onto the substrate W during a second period 420, which follows the first period 410, DIW is ejected onto the substrate W during a third period 430, which follows the second period 420, DIW and the second chemical are ejected at the same time onto the substrate W during a fourth period 440, which follows the third period 430, the second chemical is ejected onto the substrate W during a fifth period 450, which follows the fourth period 440, the second chemical and DIW are ejected at the same time onto the substrate W during a sixth period 460, which follows the fifth period 450, and DIW is ejected onto the substrate W during a seventh period 470, which follows the sixth period 460.

Substrate treatment liquids such as the first chemical, the second chemical, and DIW may be ejected by the first, second, and third nozzle heads 310, 320, and 330, and there may be periods when the substrate treatment liquids are ejected overlapping with one another and periods when the substrate treatment liquids are ejected not overlapping with one another. The first, third, fifth, and seventh periods 410, 430, 450, and 470 may correspond to the former periods, and the second, fourth, and sixth periods 420, 440, and 460 may correspond to the latter periods. In the case of a hydrophobic film obtained from hydrofluoric acid (HF) treatment, if the flow rate of DIW is low, the edge part of the substrate W may not be properly wetted. In this case, the wetting of the substrate W can be improved by ejecting both chemicals and DIW at the same time during the second, fourth, and sixth periods 420, 440, and 460. FIG. 11 is a graph showing the order in which the nozzle heads of the spray unit according to an embodiment of the present disclosure ejects substrate treatment liquids.

Figure 12:
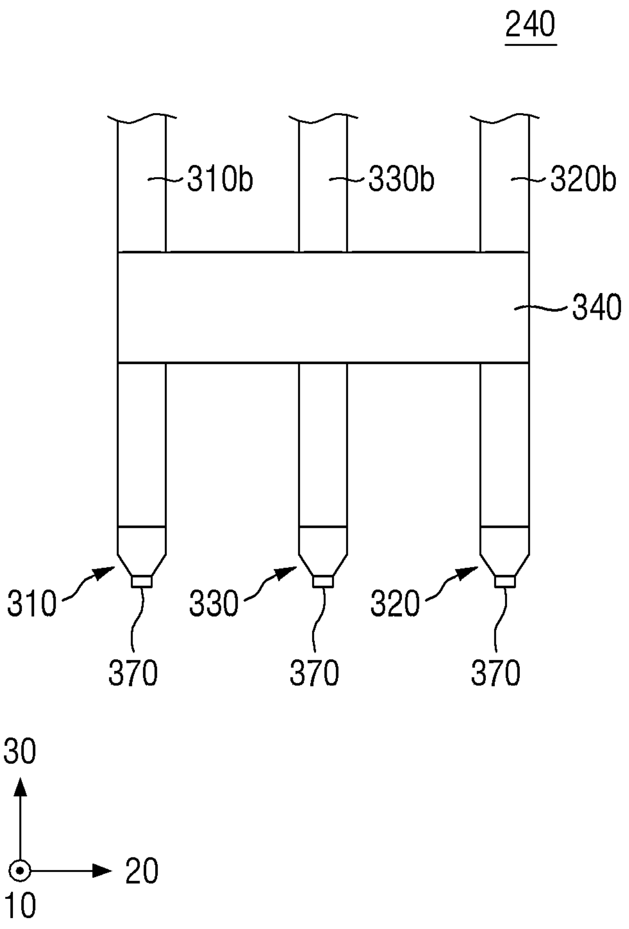
FIG. 12 is a fifth exemplary schematic view of the spray unit according to an embodiment of the present disclosure.

The first, second, and third nozzle heads 310, 320, and 330 may further include stoppers 370, which are capable of opening or shutting the first, second, and third outlets 310*a*, 320*a*, and 330*a*, as illustrated in FIG. 12.

FIG. 12 is a fifth exemplary schematic view of the spray unit according to an embodiment of the present disclosure.

Referring to FIG. 12, the stoppers 370 may open or shut the first, second, and third outlets 310*a*, 320*a*, and 330*a* of the first, second, and third nozzle heads 310, 320, and 330 may further include stoppers 370 under the control of the controller 130. The stoppers 370 may manually open or close the first, second, and third outlets 310*a*, 320*a*, and 330*a* of the first, second, and third nozzle heads 310, 320, and 330.

In a case where the first nozzle head 310 ejects the first chemical onto the substrate W, the stoppers 370 may operate to prevent the second and third nozzle heads 320 and 330 from being contaminated with the first chemical. In this case, the stoppers 370 may shut the second and third outlets 320*a* and 330*a*. The stoppers 370 may shut only the second outlet 320*a*, which ejects the second chemical onto the substrate W.

Similarly, in a case where the second nozzle head 320 ejects the second chemical onto the substrate W, the stoppers 370 may operate to prevent the first and third nozzle heads 310 and 330 from being contaminated with the second chemical. In this case, the stoppers 370 may shut the first and third outlets 310*a* and 330*a*. The stoppers 370 may shut only the first outlet 320*a*, which ejects the first chemical onto the substrate W.

The present disclosure relates to three-types of chemical nozzles that are configured to act as a single nozzle with separate outlets. The heads of the nozzles may be coupled together to eject two different chemicals, i.e., the first and second chemicals, and DIW, and may be arranged in the order of the heads of a first chemical nozzle, a DIW nozzle, and a second chemical nozzle, and the distance between the nozzles may be set such that the first and second chemicals and DIW may be ejected at the same time. That is, three nozzles having separate pipes capable of ejecting three different chemicals independently are configured to be grouped together, and the nozzle in the middle can minimize the contamination of nozzle tips with fumes or due to the scattering of the chemicals by ejecting DIW.

Also, as chemicals and DIW can be ejected overlapping with one another, the flow rate of substrate treatment liquids and the wetting of the substrate W can be improved. Also, the distance between the nozzles can be optimized in consideration of the flow rate, density, and viscosity of chemicals to minimize the scattering of the chemicals when the chemicals are ejected at the same time.

Embodiments of the present disclosure have been described above with reference to the accompanying drawings, but the present disclosure is not limited thereto and may be implemented in various different forms. It will be understood that the present disclosure can be implemented in other specific forms without changing the technical concept or gist of the present disclosure. Therefore, it should be understood that the embodiments set forth herein are illustrative in all respects and not limiting.

What is claimed is:

1. A substrate treatment apparatus comprising:

a substrate support unit supporting a substrate and including a spin head, which rotates the substrate;

a treatment liquid retrieval unit retrieving substrate treatment liquids used in treating the substrate; and a spray unit comprising a plurality of nozzle heads and pipes, each of the plurality of nozzle heads is connected to one pipe of the pipes and the spray unit sprays the substrate treatment liquids onto the substrate using the nozzle heads and the pipes, wherein the spray unit further comprises:

stoppers that each opens and closes an outlet of one nozzle head of the plurality of nozzle heads; and a nozzle head drive module that moves each of the plurality of nozzle heads, the nozzle head drive module being configured to separately adjust a position and a height of each individual ones of the plurality of nozzle heads, wherein the stoppers are configured to close all other ones of the plurality of nozzle heads while one of the plurality of nozzle heads is discharging one of the substrate treatment liquids, and wherein all of the nozzle heads are moved in a group at a same time when the spray unit is moved across the substrate.

2. The substrate treatment apparatus of claim 1, wherein the nozzle heads or the pipes are integrally coupled together via a connection member.

3. The substrate treatment apparatus of claim 1, wherein the nozzle heads include first and second nozzle heads, which eject chemicals, and a third nozzle head, which ejects deionized water (DIW).

4. The substrate treatment apparatus of claim 3, wherein the third nozzle head is disposed between the first and second nozzle heads.

5. The substrate treatment apparatus of claim 3, wherein the chemical ejected from the first nozzle head differs from the chemical ejected from the second nozzle head.

6. The substrate treatment apparatus of claim 1, wherein the nozzle heads include two nozzle heads ejecting chemicals, and the two nozzle heads are spaced apart from each other by at least a first distance.

7. The substrate treatment apparatus of claim 6, wherein the first distance is determined in consideration of an ejection flow rate of the two nozzle heads or a rotation speed of the substrate.

8. The substrate treatment apparatus of claim 7, wherein the first distance is determined in further consideration of types, densities, and viscosities of the chemicals, whether the chemicals are ejected at the same time, and distances between the substrate and the nozzle heads.

9. The substrate treatment apparatus of claim 6, wherein the nozzle heads further include a nozzle head ejecting DIW, and the distance is determined in consideration of water jumps when the chemicals and the DIW are ejected at the same time.

10. The substrate treatment apparatus of claim 6, wherein the nozzle heads further include a nozzle head ejecting DIW, and the nozzle head ejecting the DIW is not disposed between the two nozzle heads ejecting the chemicals.

11. The substrate treatment apparatus of claim 1, wherein the nozzle heads alternately eject a chemical and DIW.

12. The substrate treatment apparatus of claim 11, wherein the nozzle heads eject the chemical and the DIW at the same time for a predetermined amount of time.

13. The substrate treatment apparatus of claim 12, wherein the nozzle heads eject the chemical and the DIW at the same time when changing targets to be ejected.

14. The substrate treatment apparatus of claim 1, wherein the nozzle heads are formed to have the same height, or at least one of the nozzle heads is formed to have a different height from the other nozzle heads.

15. The substrate treatment apparatus of claim 1, wherein the nozzle heads include a nozzle head ejecting DIW, and the nozzle head ejecting the DIW ejects the DIW onto the substrate in a vertical direction.

16. A substrate treatment apparatus comprising:

a substrate support unit supporting a substrate and including a spin head, which rotates the substrate;

a treatment liquid retrieval unit retrieving substrate treatment liquids used in treating the substrate; and a spray unit comprising a plurality of nozzle heads and pipes, each of the plurality of nozzle heads is connected to one pipe of the pipes and the spray unit sprays the substrate treatment liquids onto the substrate using the nozzle heads and the pipes, wherein the spray unit further comprises:

stoppers that each opens and closes an outlet of one nozzle head of the plurality of nozzle heads; and a nozzle head drive module that moves each of the plurality of nozzle heads, the nozzle head drive module being configured to separately adjust a position and a height of each individual ones of the plurality of nozzle heads the nozzle heads or the pipes are integrally coupled together via a connection member, the nozzle heads include first and second nozzle heads that eject chemicals, and a third nozzle head that ejects deionized water (DIW), the third nozzle head being disposed between the first and second nozzle heads, and the chemicals and the DIW being ones of the substrate treatment liquids, the third nozzle head is disposed between the first and second nozzle heads, the nozzle heads eject the chemicals and the DIW alternately for a first predetermined amount of time and eject the chemicals and the DIW at a same time for a second predetermined amount of time, and the stoppers are configured to close all other ones of the plurality of nozzle heads while one of the plurality of nozzle heads is discharging one of the substrate treatment liquids.

17. A spray unit comprising:

a plurality of nozzle heads;

pipes, each of the plurality of nozzle heads is connected to one pipe of the pipes;

stoppers that each opens and closes an outlet of one nozzle head of the plurality of nozzle heads; and a nozzle head drive module that moves each of the plurality of nozzle heads, the nozzle head drive module being configured to separately adjust a position and a height of each individual ones of the plurality of nozzle heads, wherein the spray unit provides substrate treatment liquids for treating a substrate, onto the substrate through the nozzle heads and the pipes, the nozzle heads include first and second nozzle heads that eject chemicals and a third nozzle head that ejects deionized water (DIW), the chemicals and the DIW being ones of the substrate treatment liquids, the first, second, and third nozzle heads are all moved in a group at a same time when the spray unit is moved across the substrate, and the stoppers are configured to close all other ones of the plurality of nozzle heads while one of the plurality of nozzle heads is discharging one of the substrate treatment liquids.

18. The spray unit of claim 17, wherein the first, second, and third nozzle heads are integrally coupled together via a connection member.

19. The spray unit of claim 17, wherein the third nozzle head is disposed between the first and second nozzle heads.

20. The spray unit of claim 17, wherein one of the first and second nozzle heads and the third nozzle head eject a chemical and DIW at the same time for a predetermined amount of time.

* * * * *